Sept. 1, 1942.  R. McGLASSON ET AL  2,294,790
MEANS FOR PREVENTING THE FORMATION OF ICE ON AIRCRAFT
Filed Sept. 30, 1940  2 Sheets-Sheet 1
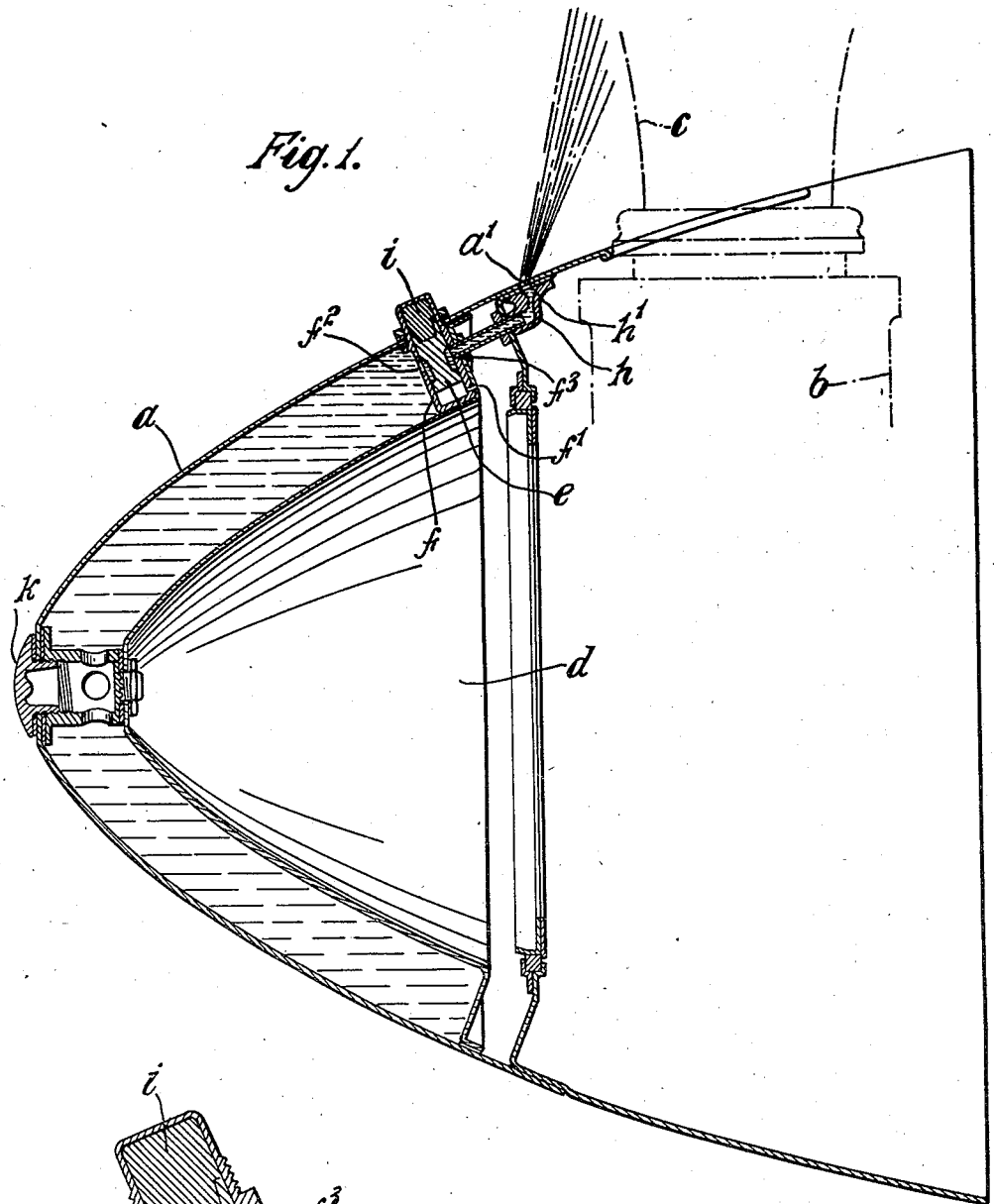
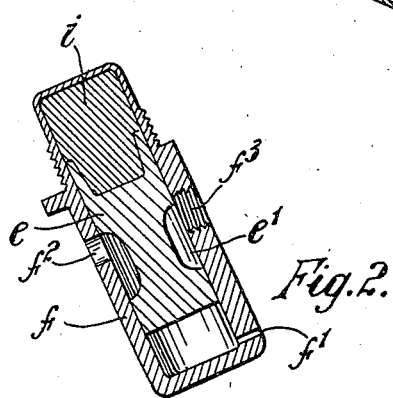
Inventors
Robert McGlasson
Frederick G. Marshall
by Babcock & Babcock
Attorneys

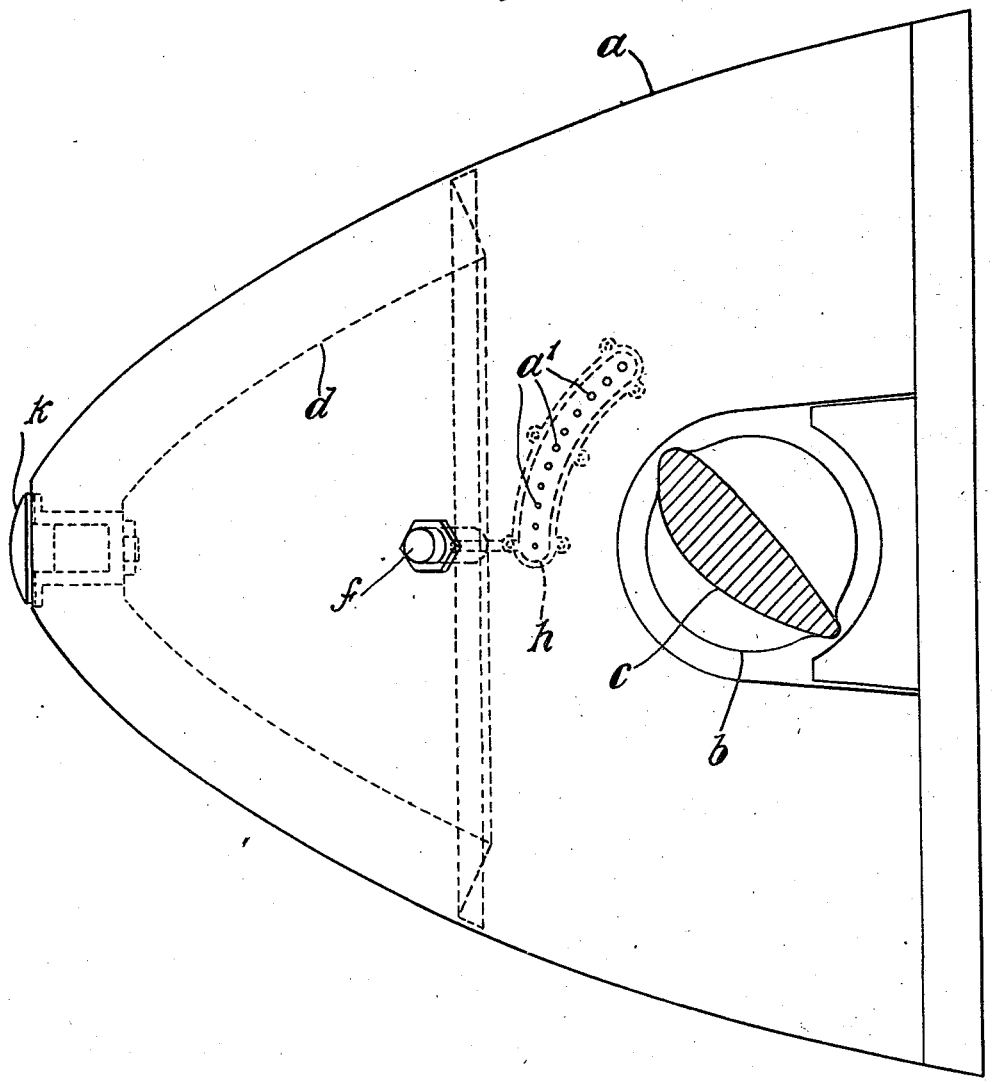

Patented Sept. 1, 1942

2,294,790

UNITED STATES PATENT OFFICE 2,294,790

MEANS FOR PREVENTING THE FORMATION OF ICE ON AIRCRAFT

Robert McGlasson and Frederick George Marshall, Leamington Spa, England, assignors to Constant Speed Airscrews Limited, Warwick, England Application September 30, 1940, Serial No. 359,122
In Great Britain December 31, 1938

6 Claims. (Cl. 244—134)

This invention relates to the prevention of ice formation on aircraft and more especially on those parts the efficiency of which is seriously affected by the deposit of ice, such as the blades of the airscrew, the spinner and the wings, tail plane, rudder and other aerofoil sections.

The object of the invention is to make the prevention of ice formation an entirely automatic operation wholly independent of the requirement of any action of the pilot.

According to the present invention the distribution of an anti-freezing material over the aircraft at the proper times is controlled automatically by the temperature of the atmosphere, the arrangement being such that the material is released for distribution when the temperature falls below a pre-determined point, and is shut off when the temperature rises above the said pre-determined point.

The invention involves the use of one or more valves between a source of supply of the anti-freezing material and a plurality of delivery orifices, said valve or valves being closed at normal atmospheric temperatures and allowed to open automatically by means responsive to changes of atmospheric temperatures.

For this purpose the movement of the valve from the closed to the open position and vice versa, may be controlled by means of mercury, the arrangement being such that when the atmospheric temperature rises above a predetermined point the expansion of the mercury closes the valve but when the temperature falls below the said pre-determined point the contraction of the mercury allows the valve to open.

In the accompanying drawings,

Figure 1 is a longitudinal sectional view of a spinner of an air-screw showing one application of the present invention.

Figure 2 is a detail sectional view of one of the valves.

Figure 3 is a plan view of the spinner showing the disposition of the delivery orifices for the anti-freezing fluid.

The spinner $a$ may be of any desired construction and secured to the hub $b$ of the airscrew in any suitable manner. For the purposes of the present invention a closed container $d$ for the anti-freezing material is fixed around the inside of the forward part of the spinner and is of annular form, preferably following the contour of the spinner, and of any desired capacity.

For each blade $c$ of the airscrew, the container is provided with a valve $e$ which, as shown, is of the piston type having an annular groove $e^1$ intermediate its length. The valve cylinder $f$ is closed at each end, except for an air-vent $f^1$ at the bottom end, and is provided at the sides with inlet and outlet ports $f^2$, $f^3$ communicating respectively with the interior of the container $d$ and with a chamber $h$ fixed to the inside wall of the spinner in front of a blade of the airscrew. Figure 3 shows the form and arrangement of this chamber which is provided with a number of delivery orifices $h^1$ through which, and through corresponding orifices $a^1$ in the wall of the spinner, the anti-freezing fluid is ejected when the spinner is rotating and the valve is open. The outer end of the valve cylinder may protrude through or be flush with the outer surface of the spinner and is filled with mercury $i$ above the valve.

The arrangement is such that the action of centrifugal force during rotation of the spinner keeps the valve in close contact with the mercury and so long as the atmospheric temperature is above a pre-determined degree, the valve remains in the closed position, none of the anti-freezing fluid being allowed to escape. When, however, during flight, the atmospheric temperature falls below the pre-determined degree, say below 15° to 25° F., the resulting contraction of the mercury $i$ allows the valve to move outwardly under the action of centrifugal force, to a position in which, as shown in Figure 1, the annular groove $e^1$ therein establishes communication between the inlet and outlet ports $f^2$, $f^3$ of the valve cylinder, i. e. between the container $d$ and the perforated chambers $h$ in front of the airscrew blade $c$. The action of centrifugal force on the anti-freezing fluid in the rotating container then causes jets of the said fluid to be ejected in front of each blade $c$ and carried onto the latter by the air current and at the same time some of the ejected fluid is distributed to other parts of the machine, such as the wings, by the action of the slip stream.

The container may be provided with a filling orifice $k$ either at the nose of the spinner, as shown, or at any suitable position on the outside or inside of the spinner.

The chamber $h$ will preferably be of such shape as to give a Venturi effect which will assist in atomising and distributing the fluid.

We claim:

1. In aircraft having a rotatable spinner for the hub of the air-screw, a container for anti-freezing material rotating with said spinner, a valve carried by said container for controlling the delivery of said material from said container, said valve being disposed for movement in a substantially radial direction relative to the rotational axis of said container so as to be subject to centrifugal force normally tending to open the valve, and means responsive to atmospheric temperature for controlling the opening of said valve and the distribution of said material over the machine.

2. In aircraft having a rotatable spinner for the hub of the airscrew, a container for anti-freezing material rotating with said spinner, and a mercury-controlled valve carried by said container and disposed for movement in a substantially radial direction relative to the rotational axis of said container so as to be normally urged radially outwardly by the action of centrifugal force, and a supply of mercury associated with said valve in such manner as to govern the radial position thereof in accordance with changes in atmospheric temperature, said valve controlling the distribution of said material over the machine.

3. In aircraft having a rotatable spinner for the hub of the airscrew, a container for anti-freezing material rotating with said spinner, a valve in said container and rotating therewith for controlling the delivery of said material therefrom, said valve comprising a valve body having inlet and delivery ports, said body extending in a substantially radial direction relative to the rotational axis of said container, and a piston disposed for substantially radial movement in said valve body, whereby said piston is subject to the centrifugal force of the rotating spinner, and means responsive to atmospheric temperature disposed in the radially outer end of said valve body and opposing said centrifugal force for controlling the opening of said valve and the distribution of the said material over the machine.

4. A de-icer for use with an aircraft having a rotatable propeller, said de-icer comprising a container associated with the propeller and disposed for rotation therewith to discharge an anti-freeze fluid onto the propeller, means for automatically regulating the discharge of said fluid comprising a substantially radially extending valve casing mounted in said container and having its radially outer end projecting externally thereof so as to be exposed to external atmospheric temperatures, said casing having an inlet port receiving fluid from said container and an outlet port, a piston disposed for substantially radial movement in said casing to control the passage of fluid therethrough, said piston being normally urged radially outwardly by centrifugal force, and temperature responsive expansible and contractible fluid enclosed in the radially outer end of said casing to govern the position assumed by said piston under the influence of centrifugal force.

5. Aircraft propeller de-icing apparatus comprising a valve cylinder mounted adjacent and disposed for rotation with the propeller and extending in a substantial radial direction relative to the rotational axis of said propeller, said casing being formed with inlet and outlet ports, means for supplying anti-freeze fluid under pressure to said inlet port, a piston disposed for substantially radial movement in said casing to control the passage of fluid between said inlet and outlet ports, said piston being normally urged radially outwardly by centrifugal force, and temperature responsive expansible and contractible means disposed in the radially outer end of said casing to govern the position assumed by said piston under the influence of centrifugal force.

6. Aircraft propeller de-icing apparatus comprising fluid supply means for directing anti-freeze fluid onto the propeller, and valve mechanism mounted for rotation with the propeller and associated with said supply means to control the passage of said fluid to the propeller, said mechanism including a piston disposed for movement in a substantially radial direction relative to the rotational axis of said mechanism and so associated with the remainder of said mechanism as to control the passage of fluid in accordance with its radial position, and temperature responsive means associated with said piston and acting in opposition to the centrifugal force induced by rotation to govern the radial position of said piston.

ROBERT McGLASSON.
FREDERICK GEORGE MARSHALL.